Patented June 16, 1925.

1,542,264

UNITED STATES PATENT OFFICE.

JAMES FLACK NORRIS AND EVERETT W. FULLER, OF CAMBRIDGE, MASSACHUSETTS.

PROCESS OF MAKING ACIDS FROM AROMATIC HYDROCARBONS.

No Drawing.     Application filed July 18, 1922. Serial No. 575,783.

*To all whom it may concern:*

Be it known that we, JAMES F. NORRIS and EVERETT W. FULLER, citizens of the United States, residing at Cambridge, in the county of Middlesex and State of Massachusetts, have invented certain new and useful Improvements in Processes of Making Acids from Aromatic Hydrocarbons, of which the following is a specification.

This invention relates to the production of acids from the corresponding aromatic hydrocarbons, and more particularly the formation of mono-basic aromatic acids.

It is an object of this invention to produce aromatic acids from the corresponding hydrocarbons and phosgene, using anhydrous aluminum chloride in the reaction.

More specifically, this invention consists in transforming benzene into benzoic acid, employing anhydrous aluminum chloride in the reaction, and conducting the process in a manner to give high yield of benzoic acid.

In the ordinary reaction between phosgene and benzene in the presence of anhydrous $AlCl_3$, there is formed benzoyl chloride and benzophenone. The reaction appears to take place in two stages, with the intermediate formation of the compound $C_6H_5COCl.AlCl_3$, which can be hydrolyzed to yield benzoic acid. However, the compound $C_6H_5COCl.AlCl_3$ reacts very rapidly with benzene which may be present and forms benzophenone, so that the final product resulting from the reaction between phosgene and benzene in the presence of anhydrous $AlCl_3$ consists almost entirely of benzophenone, practically irrespective of changes in temperature, method of mixing, ratios of reacting substances, etc.

An important feature of this invention consists in providing a method and means for retarding and preventing the reaction between the intermediate product, $C_6H_5COCl.AlCl_3$, and benzene, thus preserving the intermediate product for later hydrolysis to benzoic acid.

In the two stages reaction above described, at the very start of the reaction, more benzoyl chloride is formed than benzophenone. Very soon the reaction as a whole accelerates, but the quantity of the intermediate product, $C_6H_5COCl.AlCl_3$, formed increases comparatively slowly, while the formation of the end-product, benzophenone, increases rapidly. The maximum rate of forming benzophenone coincides with the maximum momentary concentration of benzoyl chloride, as would be expected. Thereafter, as the rate of forming benzoyl chloride drops off, as a result of the exhaustion of the phosgene, any small excess which had been built up quickly disappears, and eventually benzophenone is substantially the only product obtained. The specific reaction rate between benzoyl chloride and benzene is considerably greater than that between phosgene and benzene under conditions heretofore described. It is accordingly impractical under such conditions to carry on the reaction anywhere near to completion without having the end-product, benzophenone, present in considerably larger amounts than the intermediate product, benzoyl chloride, which is eventually converted into benzoic acid.

According to this invention there is provided a substance which serves to dilute certain of the reacting constituents and also to render the intermediate product, benzoyl chloride, non-reactive with the benzene and thus prevent conversion into benzophenone. It has been found that $CS_2$ in considerable amounts performs these functions very effectively, and when present in the reacting mixture will prevent the reaction of the benzoyl chloride—aluminum chloride with benzene. This phenomenon is apparently brought about by the insolubility in the $CS_2$ of the intermediate compound $C_6H_5COCl.AlCl_3$, being thereby thrown out from solution and thus prevented from reacting with benzene.

A specific example of carrying out this new process is as follows: A solution of phosgene in cold $CS_2$ is formed and anhydrous $AlCl_3$ in finely divided form is suspended therein. Benzene is added to this solution, and the benzoyl chloride and benzophenone combine with $AlCl_3$ to form addition products and when the reaction is complete, these addition products will be contained in the heavy, dark oil which settles in the bottom of the reacting vessel. The efficiency of this process is increased if this oil is removed as soon as possible after formation, thereby eliminating the conditions which promote secondary reactions. It is also desirable to have the upper surface of this oil as small as possible, as this also decreases the tendency for secondary reactions to take place. This dark oil is removed from the reacting vessel and treated with water, which decomposes the aluminum chloride compounds with the separation of a composition consisting of benzophenone, benzoyl chloride and any excess benzene that might be present. This oil is then treated with caustic soda or sodium carbonate solution to hydrolyze the benzoyl chloride and remove it as sodium benzoate. The sodium benzoate is then extracted with water and, when acidified, benzoic acid precipitates and may be recovered.

In carrying out this process it is desirable to work at low temperatures, owing to the volatility of the $CS_2$ and the phosgene. The reacting materials should be cooled with an ice-salt mixture and, in treating the heavy, dark oil carrying the compounds of aluminum chloride, ice-water should be used. The best results are obtained when the benzene and $AlCl_3$ are used in substantially molecular proportions. The quantity of phosgene may vary somewhat from its molecular ratio to the benzene or $AlCl_3$, without detriment to the process.

The order in which the materials are mixed with each other is important. The best results are obtained by adding benzene slowly to the carbon bisulfide-phosgene solution carrying the aluminum chloride in suspension. If either the aluminum chloride phosgene are added slowly to a composition containing the other reacting materials, an opportunity is afforded for each new mol of benzoyl chloride-aluminum chloride to react with benzene, yielding benzophenone.

Both benzoic acid and benzophenone are obtained in this process. The ratio of the yield of benzoic acid to that of benzophenone increases with increase of $CS_2$ up to about 2 to 3 mols of $CS_2$ to 1 mol phosgene and such ratio also is increased when the benzene is added slowly.

The time required for effecting complete reaction between the benzene, phosgene and aluminum chloride varies with the quantities of material treated. Completion of reaction is indicated when bubbles of HCl cease to be evolved. If properly conducted this process will produce nearly ten times as much of the benzoic acid as of the benzophenone.

Although the process of treating benzene is herein specifically set forth, it is to be understood that this invention is not so limited, but that other aromatic hydrocarbons may be similarly treated with corresponding results. Also, other substances which are capable of removing the $C_6H_5COCl.AlCl_3$ from the sphere of reaction and which will not react with the $AlCl_3$, phosgene, benzene, or mixtures of two or more of these materials, may be used in lieu of the $CS_2$, an example of such materials being petroleum ether which has been freed of unsaturated hydrocarbons.

The present invention is not limited to the specific details set forth in the foregoing examples, which should be construed as illustrative and not by way of limitation, and in view of the numerous modifications which may be effected therein without departing from the spirit and scope of this invention, it is desired that only such limitations be imposed as are indicated in the appended claims.

We claim as our invention:

1. In a process of making an aromatic acid, treating an aromatic hydrocarbon with phosgene and aluminum chloride, forming a large quantity of a compound of aluminum chloride and an aromatic acid chloride and a small quantity of a compound of aluminum chloride and a di-aryl ketone by conducting the reaction in the presence of a substance which dissolves the hydrocarbon and removes a large quantity of the reaction products from the sphere of reaction before secondary reactions therewith occur.

2. In a process of making an aromatic acid, treating phosgene and aluminum chloride with an aromatic hydrocarbon, introducing a substance which dissolves the hydrocarbon and removes a large quantity of the reaction products from the sphere of reaction before secondary reactions therewith occur.

3. In a process of making an aromatic acid, bringing together phosgene, an aromatic hydrocarbon and aluminum chloride and allowing the substances to react in the presence of carbon bisulfide.

4. In a process of making an aromatic acid, treating an aromatic hydrocarbon with phosgene and aluminum chloride, effecting the formation of a large quantity of a compound of aluminum chloride and an aromatic acid chloride, and a small quantity of a compound of aluminum chloride and a di-aryl ketone by conducting the reaction in the presence of carbon bisulfide.

5. In a process of making benzoic acid, treating phosgene and aluminum chloride with benzene, forming a large quantity of benzoyl chloride-aluminum chloride and a small quantity of benzophenone-aluminum chloride by conducting the reaction in the presence of a substance which removes a large quantity of the reaction products from the sphere of reaction before secondary reactions therewith occur.

6. In a process of making benzoic acid, treating phosgene and aluminum chloride with benzene, retarding secondary reaction of the first reaction products by introducing a substance which removes a large quantity of the first reaction products from the sphere of reaction before secondary reactions therewith occur.

7. In a process of making benzoic acid, treating phosgene and aluminum chloride with benzene, introducing a substance which removes a large quantity of the $C_6H_5COCl.AlCl_3$ from the sphere of reaction before secondary reactions therewith occur.

8. In a process of making benzoic acid, treating benzene with phosgene and aluminum chloride, effecting the formation of a large quantity of benzoyl chloride-aluminum chloride and a small quantity of benzophenone-aluminum chloride by conducting the reaction in the presence of carbon bisulfide.

9. In a process of making benzoic acid, the steps comprising bringing together phosgene, benzene and aluminum choride and allowing the substances to react in the presence of carbon bisulfide.

10. In a process of making benzoic acid, the steps comprising bringing together phosgene, benzene and aluminum chloride and allowing the substances to react in the presence of carbon bisulfide and while the reacting materials are kept cooled.

11. In a process of making an aromatic acid, treating phosgene and aluminum chloride with an aromatic hydrocarbon, forming a large quantity of a compound of aluminum chloride and an aromatic acid chloride and a small quantity of a compound of aluminum choride and a di-aryl ketone by conducting the reaction in the presence of a substance which dissolves the hydrocarbon and removes a large quantity of the reaction products from the sphere of reaction before secondary reactions therewith occur, separating the heavy oily liquid containing said compounds of aluminum choride, decomposing said heavy liquid with water, then hydrolyzing with dilute alkali solution the oily liquid resulting from said decomposition and then acidifying the resulting salt of the aromatic acid.

12. In a process of making an aromatic acid, treating phosgene and aluminum chloride with an aromatic hydrocarbon, introducing a substance which dissolves the hydrocarbon and removes a large quantity of the reaction products from the sphere of reaction before secondary reactions therewith occur, separating the heavy oily liquid containing said reaction products, decomposing said heavy liquid with water, then hydrolyzing with dilute alkali solution the oily liquid resulting from said decomposition, and then acidifying the resulting salt of the aromatic acid.

13. In a process of making an aromatic acid, the steps comprising bringing together phosgene, an aromatic carbon and aluminum choride and allowing the substances to react in the presence of carbon bisulfide, separating the heavy liquid containing the aluminum chloride compounds formed, decomposing said heavy liquid with water, then hydrolyzing with dilute alkali solution the oily liquid resulting from said decomposition and then acidifying the resulting salt of the aromatic acid.

14. In a process of making an aromatic acid, the steps comprising bringing together phosgene, an aromatic hydrocarbon and aluminum chloride and allowing the substances to react in the presence of carbon bisulfide and while the reacting materials are kept cool, separating the heavy oily liquid containing the aluminum choride compounds formed, decomposing said heavy liquid wtih cold water, then hydrolyzing with dilute alkali solution the oily liquid resulting from said decomposition and then acidifying the resulting salt of the aromatic acid.

15. In a process of making benzoic acid, treating phosgene and aluminum chloride with benzene, forming a large quantity of benzoyl chloride-aluminum chloride and a small quantity of benzophenone-aluminum chloride by conducting the reaction in the presence of a substance which removes a large quantity of the reaction products from the sphere of reaction before secondary reactions therewith occur, separating the heavy oily liquid containing said compounds of aluminum chloride, decomposing said heavy liquid with water, then hydrolyzing with dilute alkali solution the oily liquid resulting from said decomposition and then acidifying the resulting benzoate.

16. In a process of making benzoic acid, treating phosgene and aluminum chloride with benzene, introducing a substance which removes a large quantity of the $C_6H_5COCl.AlCl_3$ from the sphere of reaction before secondary reactions therewith occur, separating the heavy oily liquid containing $C_6H_5COCl.AlCl_3$, decomposing said heavy liquid with water, then hydrolyzing with dilute alkali solution the oily liquid resulting from said decomposition and then acidifying the resulting benzoate.

17. In a process of making benzoic acid, the steps comprising bringing together phosgene, benzene and aluminum chloride and allowing the substances to react in the presence of carbon bisulfide, separating the heavy oily liquid containing $C_6H_5COCl.AlCl_3$, decomposing said heavy liquid with water, then hydrolyzing with dilute alkali solution the oily liquid resulting from said decomposition and then acidifying the resulting benzoate.

18. In a process of making benzoic acid, the steps comprising bringing together phosgene, benzene and aluminum chloride and allowing the substances to react in the presence of carbon bisulfide and while the reacting materials are kept cool, separating the heavy oily liquid containing $C_6H_5COCl.AlCl_3$, decomposing said heavy liquid with cold water, then hydrolyzing with dilute alkali solution the oily liquid resulting from said decomposition and then acidifying the resulting benzoate.

19. In a process of making an aromatic acid, treating an aromatic hydrocarbon with phosgene and aluminum chloride, forming a large quantity of a compound of aluminum chloride and an aromatic acid chloride and a small quantity of a compound of aluminum chloride and a di-aryl ketone by conducting the reaction in the presence of a substance which dissolves the hydrocarbon and removes a large quantity of the reaction products from the sphere of reaction before secondary reactions therewith occur and removing the heavy oily liquid formed in the reaction before secondary reactions therewith occur.

20. In a process of making an aromatic acid, bringing together phosgene, an aromatic hydrocarbon and aluminum chloride, allowing the substances to react in the presence of carbon bisulfide and removing the heavy oily liquid formed in the reaction before secondary reactions therewith occur.

21. In a process of making benzoic acid, treating phosgene and aluminum chloride with benzene, introducing a substance which will cause the reaction to proceed with the formation of a large quantity of benzoyl chloride-aluminum chloride and a small quantity of benzophenone-aluminum chloride and removing the heavy oily liquid formed in the reaction before secondary reactions therewith occur.

22. In a process of making benzoic acid, bringing together phosgene, benzene and aluminum chloride, allowing the substances to react in the presence of carbon bisulfide and while the reacting materials are kept cool and removing the heavy oily liquid formed in the reaction before secondary reactions therewith occur.

In testimony whereof we affix our signatures.

JAMES FLACK NORRIS. [L. S.]
EVERETT W. FULLER.